Patented Dec. 15, 1953

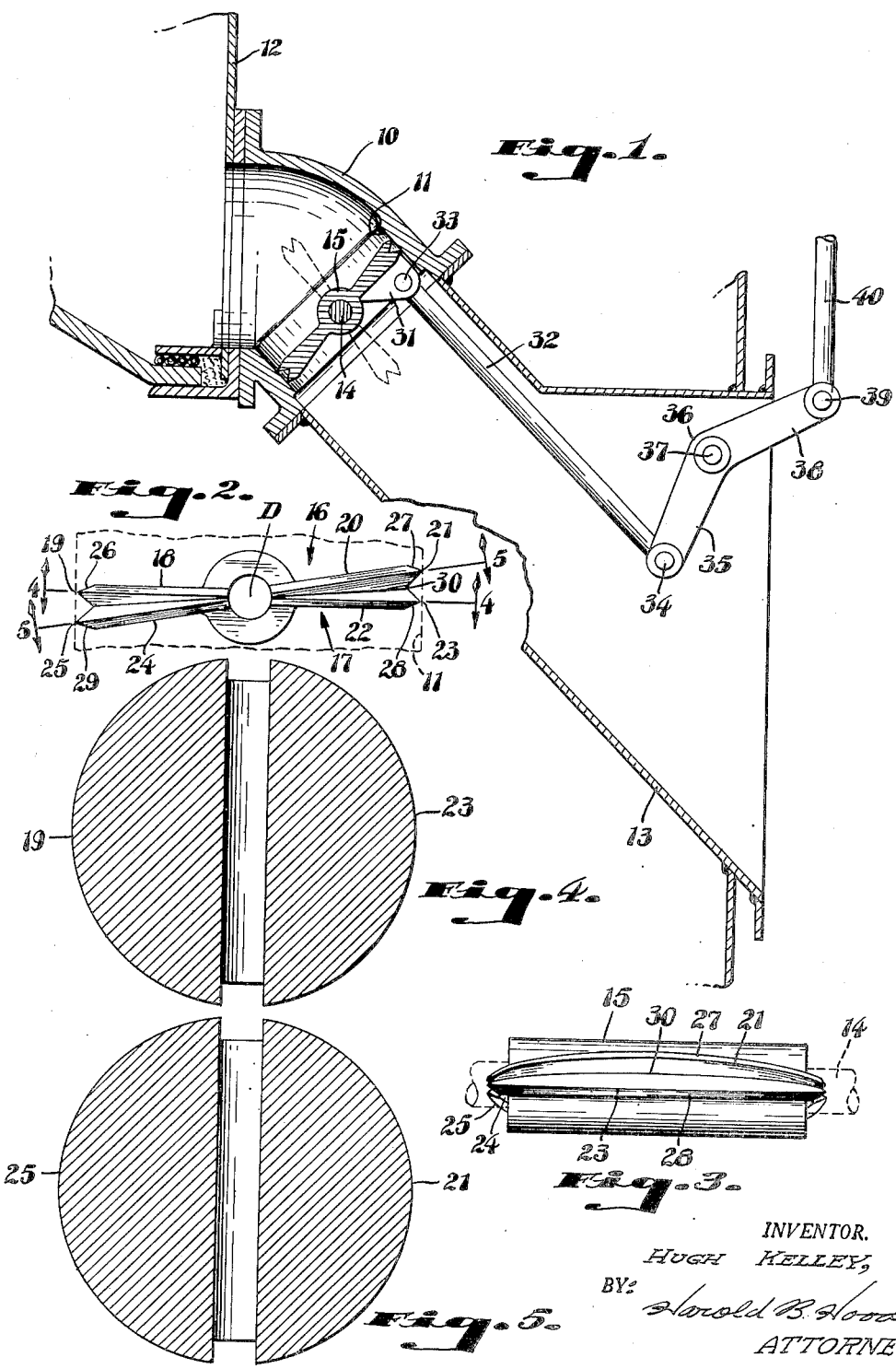

2,662,545

UNITED STATES PATENT OFFICE 2,662,545

SELF-CLEANING BUTTERFLY GATE

Hugh Kelley, Enterprise, Kans., assignor to The J. B. Ehrsam & Sons Mfg. Co., Enterprise, Kans., a corporation of Kansas Application July 25, 1951, Serial No. 238,427

10 Claims. (Cl. 137—242)

The present invention relates to a self-cleaning butterfly gate, and is primarily concerned with the provision of an improved form of butterfly valve head, primarily adapted to control the intermittent flow of material which tends to set and harden, the construction of the valve head being such that, as it moves toward closed or fully seated position, one portion of the valve head will act to clear a way or seat for another, and primarily-active, portion of such head.

A further object of the invention is to provide a novel form of butterfly valve so constructed that closure of the passage controlled thereby is primarily effected through an elliptical perimetral surface of the valve head which, in closed position of the valve, is disposed at an acute angle to the axis of the passage, a second portion of the valve, providing a circular perimetral surface, being concurrently located in perpendicular relation to such axis.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a fragmentary longitudinal section through apparatus in which my novel valve finds it primary utility;

Fig. 2 is a side elevation of a valve constructed in accordance with the present invention;

Fig. 3 is a front elevation thereof;

Fig. 4 is a section taken substantially on the line 4, 4 of Fig. 2; and

Fig. 5 is a section taken substantially on the line 5, 5 of Fig. 2.

Referring more particularly to the drawings, it will be seen that I have illustrated an outlet fitting 10 for, for instance, a calcining vat 12 in a plaster plant, said fitting 10 being disposed between said vat and a discharge chute 13 of conventional construction. The fitting 10 is formed to provide a truly cylindrical interior seating surface 11 which is traversed by a trunnion 14 upon which is supported a butterfly valve 15 for oscillation about the axis of said trunnion 14 between the closed position indicated in solid lines and an open position indicated in broken lines.

It has been found that material of the character conventionally handled in such equipment tends to stick and to harden in place, particularly on the lower surfaces of the seat 11, thereby preventing complete closure of a butterfly valve of conventional construction. The valve of the present disclosure has been designed to overcome the resultant difficulties.

As is most clearly illustrated in Fig. 2, the valve constructed in accordance with the present invention is a discoid head or body having opposite end surfaces or faces indicated generally by the reference numerals 16 and 17. One portion 18 of the end face 16 is bounded by a semicircular edge 19 terminating substantially in the ends of a selected diameter D of said body. The portion 20 of said end face 16 is bounded by a semi-elliptical edge 21 terminating substantially in the ends of said diameter D, the major radius of said edge 21 being perpendicular to said diameter D. The portions 18 and 20 of the end face 16 are disposed in angularly related planes parallel to the planes respectively defined by the edges 19 and 21, which latter planes intersect in the diameter D.

The portion 22 of the end face 17 is bounded by a semi-circular edge 23 terminating substantially in the ends of the diameter D and lying in the plane of the edge 19 on that side of the diameter D opposite the portion 18 of the face 16. The portion 24 of the face 17 is bounded by a semi-elliptical edge 25 whose major radius is equal to, and aligned with, the major radius of the edge 21, and which lies in the plane of the edge 21.

The perimetral regions of the portions 18 and 20 of the face 16 are chamfered as at 26 and 27, the perimetral regions of the portions 22 and 24 are chamfered as at 28 and 29, and the perimeter of the head is formed with a V groove 30, whereby the edges 19, 21, 23 and 25 are sharpened to substantially line thickness.

It will readily be appreciated that the edges 19 and 23, lying in a common plane, define a circle, while the edges 21 and 25, lying in a common plane, define an ellipse; and the parts are so proportioned and designed that a projection of the said ellipse onto the plane of the said circle will be substantially coincident with the said circle, the plane of the ellipse being angularly displaced from the plane of the circle in the direction of valve-opening movement, and the two planes intersecting in the diameter D.

In the assembly illustrated, a web 31 is provided on the outer face 17 of the head 15, and one end of a link 32 is pivoted at 33 to said web, the opposite end of said link being pivoted at 34 to one arm 35 of a bell crank lever 36 which is pivoted at 37, the opposite arm 38 of said lever having pivotally connected thereto at 39 an actuating element 40. The means for shifting the valve forms no part of the present invention.

When the valve is in open position, as suggested in broken lines in Fig. 1, it acts like any other butterfly valve to permit relatively free flow of material therepast from the vat 12 through the chute 13. As the valve is moved toward closed position, however, the circular perimetral surface defined by the edges 19 and 23 approaches the truly circular internal surface 11 of the fitting 10 and will engage any material adhering to the surface 11, tending to scrape such material loose from said surface. Thus the edges 19 and 23 act to clear a way for the elliptical surface defined by the edges 21 and 25 so that, as the valve attains its closed position, in which the plane of the edges 19 and 23 is perpendicular to the axis of the surface 11, the elliptical surface defined by the edges 21 and 25 will find a clear seat upon the surface 11.

I presently believe that a slight clearance, on the order of .010" to .020" will preferably be provided between the circular surface of the valve 15 and the surface 11 of the passage to be controlled by said valve. A projection of the elliptical surface onto the plane of the circular surface will, of course, have a diameter equal to the diameter of the surface 11; but the slight variation from precise coincidence between that projection and the circle defined by the edges 19 and 23 under clearance conditions above suggested is deemed to come within the expression "substantially coincident" appearing in the claims appended hereto.

I claim as my invention:

1. A butterfly valve comprising a discoid head providing a circular perimetral surface and an elliptical perimetral surface, said two surfaces being fixed with respect to each other and respectively located in separate planes angularly intersecting each other in a diameter of said circular surface.

2. The valve of claim 1 in which a projection of said elliptical surface upon the plane of said circular surface substantially coincides with said circular surface.

3. The valve of claim 1 in which the minor diameter of said elliptical surface coincides with said diameter of said circular surface.

4. The valve of claim 1 including means supporting said head for oscillation about said diameter.

5. A butterfly valve comprising an integral, discoid head having opposite end faces, one of said faces being bounded, on one side of a selected diameter of said head, by a semi-circular edge terminating substantially in the ends of said diameter and being bounded, on the other side of said diameter, by a semi-elliptical edge terminating substantially in said diameter ends, the major radius of said semi-elliptical edge being perpendicular to said selected diameter and the portions of said face on opposite sides of said selected diameter lying in angularly related planes, intersecting in said selected diameter, and the other of said end faces being bounded, on the first-named side of said selected diameter, by a semi-elliptical edge terminating substantially in the ends of said diameter, having a major radius equal to and aligned with said first-named major radius and lying in the plane of said first-named semi-elliptical edge, and said other end face being bounded, on the second-named side of said selected diameter, by a semi-circular edge terminating substantially in said diameter ends and lying in the plane of said first-named semi-circular edge.

6. The valve of claim 5 in which the perimeter of said head is formed, between said edges, with a V-groove separating said edges.

7. The valve of claim 5 in which the perimetral regions of said end faces are chamfered and the perimeter of said head is formed, between said edges, with a V-groove whereby said edges are sharpened to substantial line thickness.

8. The valve of claim 5 in which the projection of the ellipse defined by said semi-elliptical edges, upon the plane of said semi-circular edges, substantially is coincident with the circle defined by said semi-circular edges.

9. The combination with a passage of circular cross section, of a butterfly valve for controlling flow through said passage, comprising means traversing said passage upon a diameter thereof, and a discoid head supported from said means for oscillation about the axis thereof, said head being symmetrical on opposite sides of said means and providing a substantially circular perimetral surface disposed, when said valve is closed, in a plane perpendicular to the axis of said passage, and an elliptical perimetral surface, fixed with respect to said circular perimetral surface and disposed, when said valve is closed, at an angle inclined away from said first-named plane and, when so disposed, engaging and seating against the internal surface of said passage.

10. The combination of claim 9 in which the diameter of said circular surface is minutely less than the internal diameter of said passage.

HUGH KELLEY.

References Cited in the file of this patent

UNITED STATES PATENTS

| Number | Name | Date |
|---|---|---|
| 1,093,571 | Burton | Apr. 14, 1914 |
| 1,381,511 | Smith | June 14, 1921 |

FOREIGN PATENTS

| Number | Country | Date |
|---|---|---|
| 9,694 | Great Britain | of 1913 |
| 411,184 | Germany | of 1925 |